(12) United States Patent
Joy

(10) Patent No.: US 7,343,778 B1
(45) Date of Patent: Mar. 18, 2008

(54) MEASUREMENT OF AUTOMOBILE EXHAUST FLOW

(75) Inventor: Robert D. Joy, Marion, IA (US)

(73) Assignee: J-Tec Associates, Inc., Cedar Rapids, IA (US)

( * ) Notice: Subject to any disclaimer, the term of this patent is extended or adjusted under 35 U.S.C. 154(b) by 37 days.

(21) Appl. No.: 11/383,590

(22) Filed: May 16, 2006

Related U.S. Application Data

(60) Provisional application No. 60/594,946, filed on May 20, 2005.

(51) Int. Cl.
*G01M 15/10* (2006.01)

(52) U.S. Cl. .................... 73/23.31; 73/118.1

(58) Field of Classification Search ............... 73/23.31, 73/23.32, 116, 117.2, 117.3, 118.1
See application file for complete search history.

(56) References Cited

U.S. PATENT DOCUMENTS

| | | | |
|---|---|---|---|
| 4,505,160 A | | 3/1985 | Zacharias, Jr. |
| 4,660,408 A | * | 4/1987 | Lewis ...................... 73/28.06 |
| 4,742,717 A | | 5/1988 | Ichino |
| 4,783,997 A | | 11/1988 | Lynnworth |
| 5,052,425 A | * | 10/1991 | Hohenberg et al. ............ 137/1 |
| 5,184,501 A | * | 2/1993 | Lewis et al. ............... 73/23.31 |
| 5,604,319 A | * | 2/1997 | Kohsaka et al. ......... 73/863.11 |

\* cited by examiner

*Primary Examiner*—Eric S. McCall
(74) *Attorney, Agent, or Firm*—James C. Nemmers

(57) ABSTRACT

A method of overcoming the problems of measuring the exhaust flow from a vehicle engine, which flow is pulsating and reversing, making it difficult to accurately measure. An amount of flow is added to the exhaust flow so that the combined amount of flow exceeds the reversals, and therefore the flow through the primary measuring device is raised a sufficient amount so that the measured flow of the exhaust is always positive. The source of the added flow can be by diverting some of the exhaust flow itself downstream from the measurement device and reintroducing it upstream of the measurement device. In the alternative, the added flow can be from a source external to the exhaust flow.

4 Claims, 2 Drawing Sheets

MEASUREMENT OF AUTOMOBILE EXHAUST FLOW

This application claims the benefit of provisional patent application No. 60/594,946 filed May 20, 2005.

BACKGROUND OF THE INVENTION

Measurement of automobile exhaust flow by vehicle manufacturers are conducted usually in order to meet the requirements of the Environmental Protection Agency (EPA). Such measurements pose many problems. At high flows, the gas temperature is high, reaching up to 1200 degrees F. for high speed, high load conditions. At idle, the temperature is lower but the flow pulsates and in some cases actually reverses between the gas out flow bursts. This condition is more pronounced for four cylinder engines. In addition, the dew point of the exhaust gas is in the order of 150 to 170 degrees F. In emission measurements where it is necessary that the chemical composition of the exhaust gas not be changed, it is necessary for the measurement devices to be heated to above the gas dew point.

The pulsating nature of the exhaust at idle conditions poses the most severe problems to current measurement systems. To understand the nature of this flow consider the automobile engine. After a cylinder fires, the exhaust valve opens and the piston expels the gas. When the exhaust valve closes, the inertia of the flowing gas continues to push the gas out the tail pipe while creating a vacuum in the exhaust manifold. As the force of the vacuum overcomes that of the gas inertia, the flow reverses, pulling some gas back into the exhaust manifold and, under certain conditions, may pull outside air back into the tail pipe. As the engine speed increases, the exhaust valve openings occur closer together and eventually overcome the time constant of the exhaust system. Engine manufacturers make use of this effect to increase low end torque by "tuning the exhaust ports". Obviously this effect is more pronounced for 4 cylinder engines than for 6 or 8 cylinder engines.

The majority of the known measuring systems use uni-directional flow measurement devices, and since many of these devices sense pressure changes across a orifice or nozzle whose outputs are proportional to the square of the gas flow rate, then even just pulsating unidirectional flow causes errors, since the average pressure is not proportional to the square of the average gas flow. Other devices which do not have the non-linearity of the differential pressure can be used, but if there is flow reversal during the exhaust cycle, then these devices measure the outgoing flow, then measure it a second time when the reversed gas exits for the second time. Typical errors due to this can be as high as 40 to 50%.

A relatively recent exhaust flow measurement system uses an ultrasonic beam directed across and at an angle to the flow tube. The time that it takes for the ultrasonic signal to cross the flow duct is determined by the apparent speed of sound and the path length. The speed of sound is primarily a function of the gas temperature and, in addition the flow speed in the duct, "carries" the ultrasonic beam in the direction of the flow. Therefore, at room temperatures where the speed of sound is approximately 1100 feet per second, and if the ultrasonic beam is directed across the flow duct at 45 degrees, then when the exhaust flow is 100 feet per second, the apparent speed of sound is:

$$1100 \pm 100 \cos(45 \text{ degrees}) = 1100 \pm 71 \text{ feet per second.}$$

The sign depends upon the direction the flow takes in comparison to the ultrasonic signal direction. In usage, the ultrasonic flow direction is changed on alternate measurements, so that in one case the apparent speed of sound is increased and the next time it is decreased. Correct usage of this permits the actual speed of sound to be cancelled, resulting in only the speed of flow of the exhaust gas. However, these systems have significant problems since at the low flow ranges where the flow is 1 to 4 feet per second, and where the gas is hot with a speed of sound of 1500 FPS, then the measurement consists of trying to separate a 1 to 4 FPS from 1500 FPS in a dynamic flow condition.

Significant errors are being found potentially ruling out this approach. To demonstrate the flow measurement problem, measurements were taken with a vortex type meter which consists of a non-streamlined strut held in the flow stream. As the flow passes this strut, vortices are formed and are shed behind the strut. Downstream a short distance is an ultrasonic beam, which intercepts the vortices as they pass. Descriptions of this measuring technique are contained in U.S. Pat. Nos. 3,680,375, Joy et al; 4,437,349, Joy; 4,240,299, Joy et al; 3,979,309, Joy et al, and in Society of Automotive Engineers publications "Vortex flowmeter applications to automobile engine control", R. D. Joy, 1975.

This type of sensor produces a sine wave type output, with the frequency of the sine wave being linearly proportional to the volumetric flow rate of the gas and independent of the gas composition. An example of the sensor output under steady flow is shown below in FIG. 1. The frequency of this type output is determined by counting the positive going transitions of the signal across some reference line. If this reference line passes through each cycle of the output signal, then an accurate frequency count can be determined.

However, under pulsating exhaust flow at idle of a 2.0 liter four cylinder engine, the sensor output is shown in FIG. 2. The engine was running at about 750 RPM, and with two cylinder firings per revolution there would be about 25 exhaust bursts per second. The scale on the second plot runs from 0 to 80 milliseconds, so the two bursts represent two exhaust valve openings. In between the two bursts is some indication of reverse flow occurring. Counting the zero crossings shown in this figure indicate a flow rate of about 30 cubic feet per minute. However, it was known that the actual exhaust rate should be between 5 and 10 CFM.

In the past, a common practice to measure the low flow was to run the exhaust flow through one or two barrels which combined the flow with the flow resistance in the connecting pipes to create a smoothing filter. The measurement device then could be placed at the exit of the last barrel, where the flow was smooth and continuous. While this approach can be used to measure the low speed exhaust rate, it has the disadvantages of imposing a time lag of several seconds on the flow, which prevents measurement of rapid flow changes. Also, because the barrels and connecting pipes were difficult to heat, condensation occurred, changing the chemical analysis of the gas, which analysis is required under EPA vehicle certification. Consequently, the automobile industry was forced to collect the exhaust gas in large plastic bags, and to prevent condensation, dry air of a known amount was added to lower the mixtures dew point below ambient temperatures. While this has worked for several years, it has become difficult to handle because the added dry air in many cases is now more "dirty" than the exhaust gas emitted by the engine. The industry is now developing a "clean air system" to remove the hydrocarbons and nitrous oxide compounds.

The test method preferred by both the automobile industry and the EPA is to directly measure the exhaust flow rate without allowing condensation, and withdrawing a small gas sample proportional to the flow rate for analysis. The engine is put through a simulated driving cycle, using a dynamometer and containing a number of rapid accelerations, which must be followed by the exhaust flow device. The AIGER (American Industry/Government Emissions Research) "Specifications for Advanced Emissions Test Instrumentation" specifies a flow range of 0 to 200 SCFM for light duty vehicles and 0 to 500 SCFM for heavy vehicles. It also requires a response time of 0.1 seconds and a pressure drop across the test device of ±1 inch of $H_2O$ over the full range of the flow.

A number of measurement systems are being evaluated by the automotive industry, but none are adequately able to measure the low flow, where the gas is pulsating and flow reversal occurs. One of the leading exhaust flow measurement systems utilizes a large chamber to help smooth out the pulsations, but this lengthens the time response to an unacceptable level. In addition, the pressure drop in this instrument exceeds that allowed, so it incorporates a vacuum blower to equalize the pressure drop.

It is therefore an object of the invention to create a method where the problems of these prior art systems can be overcome.

SUMMARY OF THE INVENTION

The method of the invention overcomes the problems of measuring the exhaust flow during pulsating and reversing flow by adding an amount of flow to the exhaust flow, which amount exceeds the reversals and raises the flow through the primary measuring device sufficiently so that the flow is always positive within it.

DESCRIPTION OF THE PREFERRED EMBODIMENT OF THE INVENTION

Figure 1:
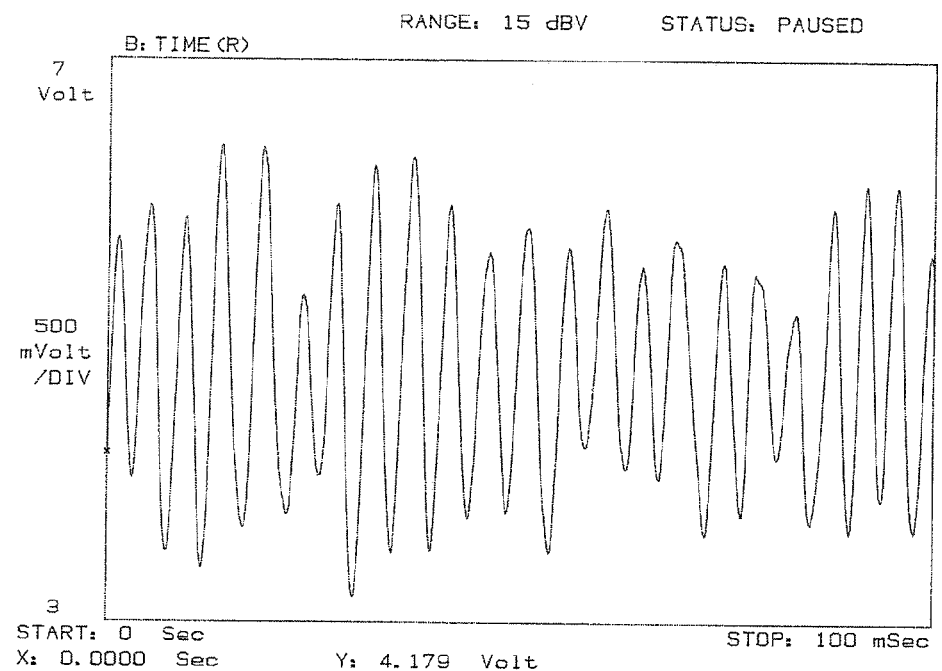
FIG. 1 is a graph showing the sensor output of the exhaust flow under steady flow conditions.
Figure 2:
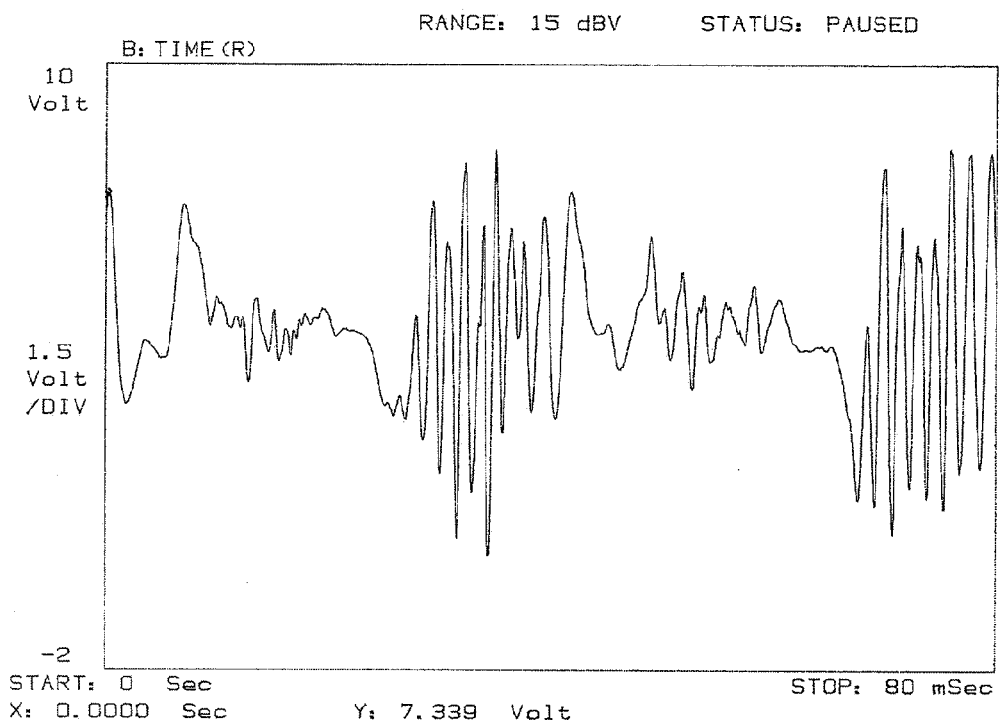
FIG. 2 is a graph showing the sensor output of the exhaust flow under pulsating flow conditions.
Figure 3:
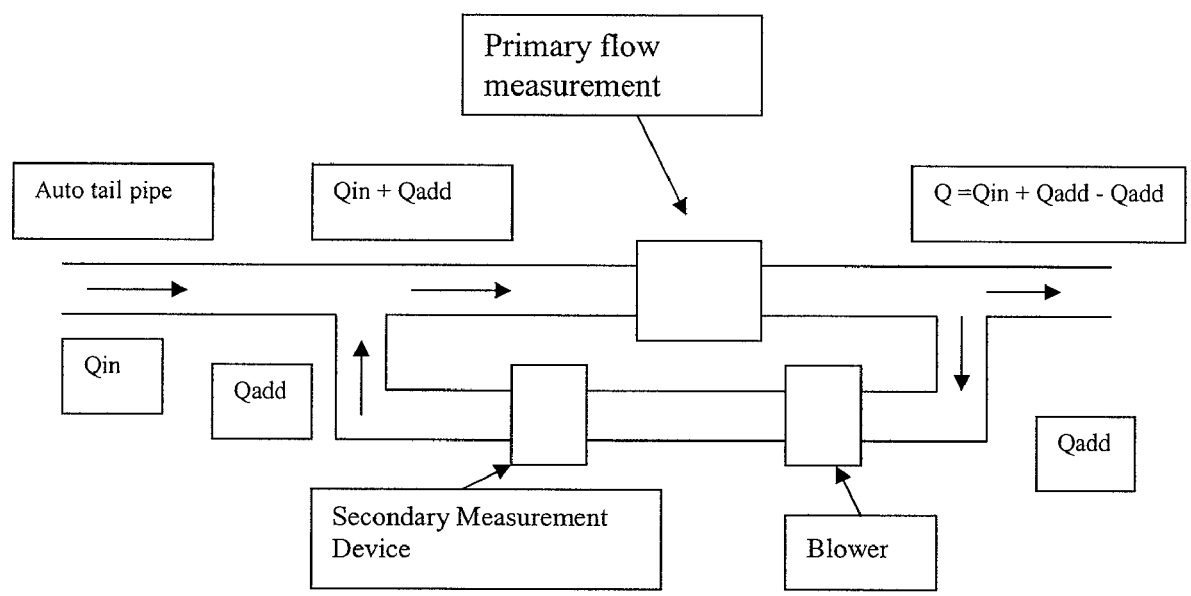
FIG. 3 is a block diagram illustrating the method of the invention.

As already stated, the problems of measuring the exhaust flow during pulsating and reversing flow are overcome by adding an amount of flow to the exhaust flow, which amount exceeds the reversals and raises the flow through the primary measuring device a sufficient amount so that the flow is always positive within the primary measuring device. This method is illustrated in the drawing of FIG. 3.

As an example of this technique, suppose in the above drawing the input from the tail pipe of the automobile under test, Qin, ranges from −5 to +200 cubic feet per minute (CFM). A blower in the lower flow duct creates a flow of 10 CFM, Qadd, which is added to the exhaust flow creating a flow value of Qin+Qadd=−5 to 200+10 CFM. Therefore, the flow through the primary measurement device will vary from +5 to +210 CFM and is always unidirectional and above the minimum detectable flow of the primary measurement device. This added flow of Qadd is measured by the secondary measurement device, and to obtain the actual exhaust flow is subtracted from that measured by the primary measurement device.

Since the added flow is taken from the output exhaust gas, it also has to operate at the same temperature as the primary measurement device. However, the added gas could be supplied from a separate source, provided the density and temperature match that of the primary gas flow.

While the description is for an automobile exhaust flow, the method of the invention works equally as well for other gas or liquid flows where large dynamic ranges are desired. Other benefits that accrue from the invention are as follows:

1. The added flow can be set above whatever is the minimum measurable flow of the primary measurement device.
2. The pressure drop across the total measurement system can be reduced by increasing the diameter of the primary device and increasing the added flow to keep above the minimum measurable flow of the primary device.
3. The technique can be applied to any flow measurement systems and is not limited to the vortex system used in the example set forth above.
4. The typical operating dynamic range (ratio of minimum to maximum) of a flow sensor is about 1:50 or 1:75. However the operating flow range required for the emissions testing can be 1 to 200, or possibly −5 to 300. This can be achieved by increasing the added flow such that the total flow through the primary device falls within its operating range. That is, if −5 to 300 CFM is required, but the primary device has a dynamic range of 1:75 then by adding 9 CFM the total flow in the primary device would be 4 to 309 or a ratio of 1:77.

Having thus described the invention in connection with the preferred embodiments thereof, it will be evident to those skilled in the art, that various revisions can be made to the preferred embodiments described herein, without departing from the spirit and scope of the invention. It is my intention, however, that all such revisions and modifications that are evident to those skilled in the art will be included within the scope of the following claims.

What is claimed is:

1. A method of improving the measurement of the flow of gases where the flow pulsates and/or reverses, the method comprising the steps of:

providing a primary flow measurement device in the flow of gases to measure the primary flow;

adding to the primary flow of gases upstream from the primary flow measurement device a secondary flow of gases; and controlling the amount of the secondary flow to stabilize the primary flow, the source of the secondary flow being produced by tapping the primary flow downstream from the measurement device and adding the secondary flow to the primary flow upstream from the primary flow measurement device.

2. The method of claim 1, in which the source of the secondary flow is produced from an independent source of gas in which the density and temperature of the secondary flow matches that of the primary gas flow.

3. The method of claim 1, in which the amount of the secondary flow is controlled to be above the minimum flow measured by the primary flow measurement device.

4. A method of improving the measurement of the flow of exhaust gases from a vehicle engine, where the flow to be measured pulsates and/or reverses, the method comprising the steps of:

providing a primary flow measurement device in the flow of exhaust gases to measure the primary flow;

tapping the primary flow of exhaust gases downstream from the measurement device to produce a secondary flow of exhaust gases;

adding the secondary flow of exhaust gases to the primary flow of exhaust gases upstream from the primary flow measurement device; and controlling the amount of the secondary flow of exhaust gases to stabilize the primary flow by adding a sufficient amount of secondary flow exhaust gases to produce a combined flow of exhaust gases above the minimum measurable flow of the primary flow measurement device.

* * * * *